US009919397B2

(12) United States Patent
Maseki et al.

(10) Patent No.: US 9,919,397 B2
(45) Date of Patent: Mar. 20, 2018

(54) FLEXIBLE MANUFACTURING SYSTEM

(71) Applicant: JTEKT CORPORATION, Osaka-shi (JP)

(72) Inventors: Katsuhiro Maseki, Nagoya (JP);
Tatsuhiko Inagaki, Ichinomiya (JP);
Takaaki Sugiura, Chita-gun (JP);
Kazuhiro Tsujimura, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 681 days.

(21) Appl. No.: 14/540,411

(22) Filed: Nov. 13, 2014

(65) Prior Publication Data

US 2015/0142156 A1 May 21, 2015

(30) Foreign Application Priority Data

Nov. 19, 2013 (JP) ................................ 2013-238920

(51) Int. Cl.
*G06F 19/00* (2011.01)
*B23Q 7/14* (2006.01)
(Continued)

(52) U.S. Cl.
CPC ......... *B23Q 7/1431* (2013.01); *B23Q 7/1426* (2013.01); *B23Q 17/0909* (2013.01);
(Continued)

(58) Field of Classification Search
CPC ...... B24B 55/02; B23Q 7/1426; B23Q 41/02; B23Q 7/1431; B23Q 3/18; B23Q 3/15526; B23Q 1/0072; B08B 3/02; B65G 61/00
See application file for complete search history.

(56) References Cited

U.S. PATENT DOCUMENTS 4,621,410 A * 11/1986 Williamson ......... B23Q 7/1426
29/563
4,648,171 A * 3/1987 Yasukawa .......... B23Q 3/15526
483/1

(Continued)

FOREIGN PATENT DOCUMENTS

EP 2 181 801 A1 5/2010
GB 1 254 988 A 11/1971

(Continued)

OTHER PUBLICATIONS

U.S. Appl. No. 14/451,895, filed Aug. 5, 2014, Maseki, et al.
Extended European Search Report dated Mar. 26, 2015 in Patent Application No. 14193380.4.

*Primary Examiner* — Tuan Vu
(74) *Attorney, Agent, or Firm* — Oblon, McClelland, Maier & Neustadt, L.L.P.

(57) ABSTRACT

There is provided a flexible manufacturing system that can reliably place a workpiece that isn't defective piece in a state where the workpiece will be machined again. After a pallet is conveyed to a standby position and before machining of the workpiece attached to the pallet is started, controllers determines whether machining of the workpiece with a corresponding machining device is possible. When it is determined that machining is possible, the controller starts machining with the machining device. When it is determined that machining is impossible, the controller make a conveyor convey the pallet from the standby position to a pallet storage room, and stores the machining status information on the conveyed pallet as the machining-waiting state.

4 Claims, 10 Drawing Sheets

(51) Int. Cl.

| | |
|---|---|
| *B23Q 17/09* | (2006.01) |
| *B23Q 41/02* | (2006.01) |
| *B23Q 41/06* | (2006.01) |
| *G05B 19/00* | (2006.01) |
| *G05B 15/02* | (2006.01) |

(52) U.S. Cl.
CPC ............ *B23Q 41/02* (2013.01); *B23Q 41/06* (2013.01); *G05B 15/02* (2013.01); *G05B 19/00* (2013.01)

(56) References Cited

U.S. PATENT DOCUMENTS

| | | | | |
|---|---|---|---|---|
| 4,890,371 | A | * | 1/1990 | Camloh .................... B08B 3/02 134/133 |
| 5,993,297 | A | * | 11/1999 | Hyatt ...................... B24B 55/02 451/450 |
| 2002/0148820 | A1 | * | 10/2002 | Tomlinson ............... B23Q 3/18 219/121.82 |
| 2009/0206225 | A1 | * | 8/2009 | Kobayashi ........... B23Q 1/0072 248/346.03 |
| 2010/0042249 | A1 | * | 2/2010 | Wada ...................... B65G 61/00 700/215 |
| 2010/0106281 | A1 | * | 4/2010 | Niimi ................... B23Q 7/1426 700/112 |

FOREIGN PATENT DOCUMENTS

| | | |
|---|---|---|
| JP | 63-108411 | 5/1988 |
| JP | 2735561 | 4/1998 |
| JP | 2001-18150 A | 1/2001 |
| JP | 2010-134900 | 6/2010 |

* cited by examiner

FIG. 2

| PALLET NO. | POSITION | ORDER OF PRIORITY | MACHINING STATUS INFORMATION |
|---|---|---|---|
| 111 | P02 | 3 | SUSPENDED STATE |
| 125 | P01 | 4 | MACHINING-WAITING STATE |
| 213 | P04 | 2 | DEFECTIVE STATE |
| 185 | P09 | 5 | MACHINING-WAITING STATE |
| 149 | P03 | 1 | MACHINING COMPLETION STATE |
| ... | ... | ... | ... |

//
FLEXIBLE MANUFACTURING SYSTEM

INCORPORATION BY REFERENCE

The disclosure of Japanese Patent Application No. 2013-238920 filed on Nov. 19, 2013 including the specification, drawings and abstract, is incorporated herein by reference in its entirety.

BACKGROUND OF THE INVENTION

1. Field of the Invention

The invention relates to a flexible manufacturing system. The flexible manufacturing system includes: a machining device that machines a workpiece; a pallet changer that exchanges pallets between a standby position and a machining position in the machining device; a pallet storage room that stores pallets to which workpieces have been attached; and a conveyor that conveys the pallets between the pallet storage room and the pallet changer.

2. Description of the Related Art

For example, Japanese Patent Application Publication No. 2010-134900 (JP 2010-134900 A) describes an example of a conventional flexible manufacturing system (hereinafter, referred to as "FMS" in abbreviated form) that allows manufacturing of wide variety of products in small quantities. JP 2010-134900 A describes a technique of conveying pallets disposed in a pallet storage room to a standby position of a pallet changer in a prescribed order. Japanese Patent Application Publication No. 63-108411 (JP 63-108411 A) and Japanese Patent No. 2735561 describe that whether machining is possible is determined based on tool information on a machining device.

In the FMS described in JP 2010-134900 A, when a machining device is machining a workpiece at a machining position, a tool in use may be broken. In this case, the workpiece that is being machined is treated as a defective piece. Further, under abnormal tool conditions, a workpiece that has already been conveyed to the standby position of the pallet changer is also treated as a defective piece. However, the workpiece at the standby position has not been machined and thus is not a defective piece.

SUMMARY OF THE INVENTION

One object of the invention is to provide a flexible manufacturing system that makes it possible to reliably place a workpiece that is not a defective piece in a state where the workpiece will be machined again.

A flexible manufacturing system according to an aspect of the invention includes:

a machining device that has a machining position where a pallet is disposed during machining, and machines a workpiece that has not been machined and that is attached to the pallet disposed at the machining position;

a pallet storage room that stores a plurality of the pallets;

a pallet changer that is provided integrally with or adjacent to the machining device, has a standby position where the pallet to be moved to the machining position stands by, and exchanges the pallet at the machining position for the pallet at the standby position;

a conveyor that is able to convey the pallet between the pallet storage room and the standby position of the pallet changer; and a controller that controls the machining device and the pallet changer, and controls the conveyor based on machining status information associated with each of the pallets stored in the pallet storage room.

The machining status information includes a machining-waiting state and a machining completion state.

After the pallet is conveyed to the standby position and before machining of the workpiece attached to the pallet is started, the controller determines whether machining of the workpiece with the machining device is possible.

When it is determined that machining is possible, the controller starts machining with the machining device.

When it is determined that machining is impossible, the controller makes the conveyor convey the pallet from the standby position to the pallet storage room, and stores the machining status information on the conveyed pallet as the machining-waiting state.

As described above, even after the pallet is conveyed to the standby position, if the workpiece attached to the pallet has not been machined, the pallet is returned to the pallet storage room when it becomes impossible to machine the workpiece with the machining device. Then, the machining status information on the pallet returned to the pallet storage room is stored as the machining-waiting state instead of the defective state. Thus, when there is a machining device that is able to machine the workpiece attached to the pallet, the pallet is conveyed to the machining device. That is, the workpiece attached to the pallet is machined ultimately without being treated as a defective piece.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a table illustrating the information stored in a cell controller;

DETAILED DESCRIPTION OF EMBODIMENTS

Hereinafter, the configuration of a flexible manufacturing system according to an embodiment of the invention will be described with reference to FIG. 1. Hereinafter, the flexible manufacturing system will be abbreviated as "FMS". The FMS is a system in which a workpiece W attached to a pallet P is machined by a first machining device 11 or a second machining device 12. Workpieces W are sequentially machined based on a manufacturing plan set in advance.

Figure 1:
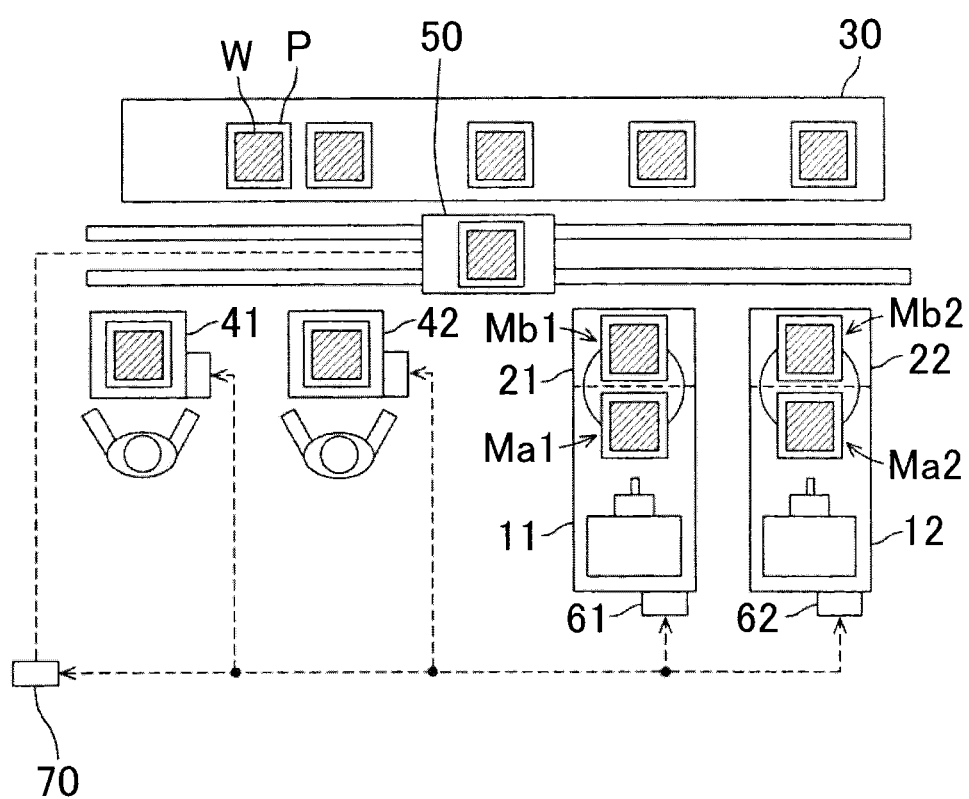
FIG. 1 is an overall configuration diagram illustrating a flexible manufacturing system according to an embodiment of the invention.

As illustrated in FIG. 1, the FMS includes the first and second machining devices 11, 12, first and second pallet changers 21, 22, a pallet storage room 30, loading stations 41, 42, a conveyor 50, first and second CNC system controllers 61, 62, and a cell controller 70. Hereinafter, each of the loading stations will be abbreviated as "LD-ST".

The first and second machining devices 11, 12 machine workpieces W that have not been machined. As the first and second machining devices 11, 12, for example, machining centers are used. However, other kinds of machine tools may be adopted as the machining devices 11, 12. The first and second machining devices 11, 12 respectively have machining positions Ma1, Ma2 where the pallets P to which the workpieces W are attached are disposed. The machining device 11 has one machining position Ma1, and the machining device 12 has one machining position Ma2. The machining devices 11, 12 machine the workpieces W, which have not been machined and which are attached to the pallets P disposed at the machining position Ma1, Ma2, to form machined products.

In some cases, the same kind of machining centers (machining devices) are adopted as the first machining device 11 and the second machining device 12. And in these cases, tool magazines of the first and second machining devices 11, 12 store the same kinds of tools (for example, the tools stored in the tool magazine of the first machining device 11 are tool A, tool B and tool C, the tools stored in the tool magazine of the second machining device 12 are tool A, tool B and tool C). In these case, the variety of the workpieces W that can be machined by the first machining device 11 is the same as the variety of the workpieces W that can be machined by the second machining device 12. In other cases, the same kind of machining centers are adopted as the first machining device 11 and the second machining device 12 but the tool magazines of the first and second machining devices 11, 12 store different kinds of tools (for example, the tools stored in the tool magazine of the first machining device 11 are tool A, tool B and tool C, the tools stored in the tool magazine of the second machining device 12 are tool X, tool Y and tool C,). In these cases, there is a workpiece W that can be machined by the first machining device 11 but cannot be machined by the second machining device 12. The following description will be provided on the assumption that the first machining device 11 and the second machining device 12 are the same kind of machining centers and store the same kind of tools.

The first and second pallet changers 21, 22 are provided integrally with the first and second machining devices 11, 12 or adjacent to the first and second machining devices 11, 12, respectively. The first and second pallet changers 21, 22 have standby positions Mb1, Mb2 where the next pallets P to be moved to the machining positions M1a, Ma2 of the first and second machining devices 11, 12 stand by, respectively. The first and second pallet changers 21, 22 exchange the pallets P at the machining position Ma1, Ma2 of the first and second machining devices 11, 12 for the pallets P at the standby positions Mb1, Mb2, respectively. That is, the first and second pallet changers 21, 22 are operated to move the workpieces W that have not been machined to the machining positions Ma1, Ma2 and to move the machined product formed by the first and second machining devices 11, 12 to the standby positions Mb1, Mb2, respectively.

The pallet storage room 30 stores a plurality of the pallets P. Each of the workpieces W that are attached to the pallets P stored in the pallet storage room 30 is a workpiece that has not been machined, a machined product, or a defective piece.

The LD-STs 41, 42 are places through which the pallets P, to which new workpieces W are attached by workers, are loaded into the FMS. The LD-STs 41, 42 are also places through which machined products are carried out from the FMS. In the present embodiment, two LD-STs are illustrated.

The conveyor 50 is movable on a linear rail disposed between the pallet storage room 30, and the first and second machining devices 11, 12 and the LD-STs 41, 42. When the conveyor 50 is a rail guided vehicle (RGV), the conveyor 50 moves on two rails. When the conveyor 50 is a stacker crane, the conveyor moves along one rail. In FIG. 1, the conveyor 50 is movable rightward and leftward. The conveyor 50 conveys the pallets P between the pallet storage room 30, the LD-STs 41, 42, and the standby positions Mb1, Mb2 of the first and second pallet changers 21, 22.

The first CNC system controller 61 controls the first machining device 11 and the first pallet changer 21. The second CNC system controller 62 controls the second machining device 12 and the second pallet changer 22. Specifically, the CNC system controllers 61, 62 respectively control, for example, the machining operations of the machining devices 11, 12, and control the pallet exchange operations by the pallet changers 21, 22.

The cell controller 70 controls the conveyor 50. The cell controller 70 controls the conveyor 50 such that the workpieces W are machined according to the stored order of priority for machining of the workpieces W. The order of priority is input by the worker when a new item is loaded on each of the LD-STs 41, 42. The cell controller 70 acquires signals from the LD-STs 41, 42 to determine the order of priority.

Basically, when the workpieces W, which are new normal items, are loaded, the cell controller 70 executes control to convey the pallets P such that the workpieces W are machined according to a loading order. However, when the kinds of tools stored in the machining device 11 and the kinds of tool stored in the machining device 12 differ from each other, an actual machining order may differ from the loading order. For example, when there is a tool shortage, a pallet loading abnormality, or the like in the first machining device 11, the machining order for the pallet P located at the first machining device 11 or the first pallet changer 21 may be delayed (described later in detail).

Next, information stored in the cell controller 70 will be described with reference to FIG. 2. As illustrated in FIG. 2, the cell controller 70 stores, as information associated with each pallet P, the pallet number, position, priority order, and machining status information. The position means the pallet storage position in the pallet storage room 30, or the machining positions Ma1, Ma2, or the standby positions Mb1, Mb2. The priority order means the order of conveying the pallets P from the pallet storage room 30 to the first and second machining devices 11, 12.

The machining status information indicates whether the workpiece W is in a machining-waiting state (pre-machining state), a suspended state (pre-machining state), a machining completion state (machined product state), or a defective state. The machining-waiting state means a state where any one of the machining devices 11, 12 is able to machine the workpiece W, and means a state where the workpiece W is waiting to be machined. The suspended state means a state where none of the machining devices 11, 12 are able to machine the workpiece W. An example of the suspended state is a state where, in both the machining devices 11, 12, the tools necessary to machine the workpieces W are unusable because the tools are broken or reach the end of their useful lives. An example of the defective state is a state where the tool is broken in the course of machining the workpiece W and the workpiece W is a so-called defective piece.

Figure 3:
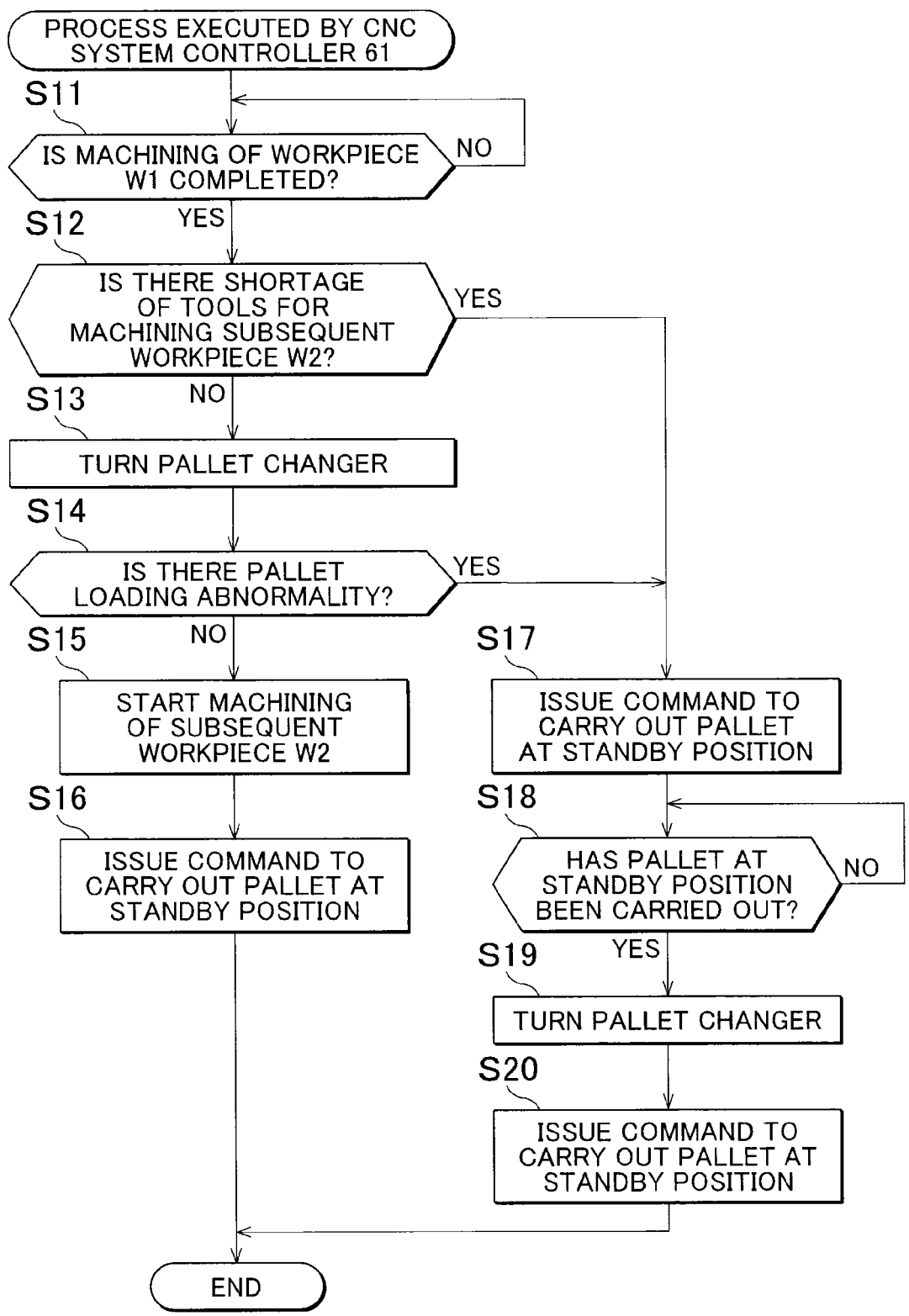
FIG. 3 is a flowchart illustrating a process executed by a CNC system controller.

Next, a process executed by the first CNC system controller 61 will be described with reference to the flowchart in FIG. 3. The first CNC system controller 61 will be described below, but the second CNC system controller 62 executes substantially the same process as that executed by the first CNC system controller 61.

The first CNC system controller 61 determines whether machining of a workpiece W1 at the first machining position Ma1 is completed (S11). When a negative determination is made in S11 (S11: NO), the first CNC system controller 61 continues executing S11 until machining of the workpiece W1 is completed. When machining of the workpiece W1 is completed (S11: YES), the first CNC system controller 61 inquires of the cell controller 70 about a determination as to whether a subsequent workpiece W2 attached to the pallet P at the first standby position Mb1 at the present time can be machined by the first machining device 11.

The cell controller 70 checks whether the first machining device 11 stores all the tools necessary to machine the subsequent workpiece W2, and gives the check result to the first CNC system controller 61. The determination is made after the subsequent workpiece W2 is conveyed to the first standby position Mb1 and before the subsequent workpiece W2 is machined, more specifically, before the subsequent workpiece W2 is moved to the first machining position Ma1.

In detail, the cell controller 70 determines whether there is a tool shortage in the first machining device 11 as the above mentioned check. When the cell controller 70 determines that there is no shortage of tools for machining the subsequent workpiece W2 in the first machining device 11 (S12: NO), that is, the subsequent workpiece W2 can be machined by the first machining device 11, and when the cell controller 70 gives the determination result to the first CNC system controller 61, the first CNC system controller 61 turns the first pallet changer 21 to exchange the pallet P at the first machining position Ma1 for the pallet P at the first standby position Mb1 (S13). Subsequently, the first CNC system controller 61 determines whether a loading abnormality of the pallet P occurs at the first machining position Ma1 (S14). A loading abnormality corresponds to, for example, a case where foreign matter is caught between the first machining position Ma1 and the pallet P.

When there is no pallet loading abnormality (S14: NO), the first CNC system controller 61 makes the first machining device 11 start machining of the subsequent workpiece W2 at the first machining position Ma1 (S15). Subsequently, the first CNC system controller 61 outputs, to the cell controller 70, a command signal for carrying out the pallet P, which has been moved to the first standby position Mb1, from the first standby position Mb1 (S16). That is, the pallet P moved to the first standby position Mb1 is conveyed to the pallet storage room 30 by the conveyor 50. Then, the process executed by the first CNC system controller 61 ends.

On the other hand, when the cell controller 70 determines that there is a shortage of tools for machining the subsequent workpiece W2 in the first machining device 11 (S12: YES), that is, the first machining device 11 is not able to machine the subsequent workpiece W2, or when the first CNC system controller 61 determines that a pallet loading abnormality occurs (S14: YES), the first CNC system controller 61 outputs, to the cell controller 70, a command signal for carrying out the pallet P at the first standby position Mb1, from the first standby position Mb1 (S17).

Subsequently, the first CNC system controller 61 determines whether the pallet P at the first standby position Mb1 has been carried out from the first standby position Mb1 (S18). When the pallet P at the first standby position Mb1 has been carried out from the first standby position Mb1 (S18: YES), the first CNC system controller 61 turns the first pallet changer 21 to move the pallet P at the first machining position Ma1 to the first standby position Mb1 (S19). Subsequently, the first CNC system controller 61 outputs, to the cell controller 70, a command signal for carrying out the pallet P, which has been moved to the first standby position Mb1, from the first standby position Mb1 (S20). Then, the process executed by first CNC system controller 61 ends.

Next, a process executed by cell controller 70 will be described. As described above, the cell controller 70 executes mainly the control of the conveyor 50. When none of a tool shortage due to tool breakage or expiration of tool useful life, and a pallet loading abnormality has occurred, the pallets P are conveyed between the LD-STs 41, 42, the pallet storage room 30, and the first and second standby positions Mb1, Mb2 based on a manufacturing plan set in advance. A process executed by the cell controller 70 when a tool shortage or a pallet loading abnormality occurs will be described with reference to the flowcharts in FIG. 4 and FIG. 5.

The cell controller 70 determines whether a tool shortage signal is acquired from each of the CNC system controllers 61, 62 (S21). For example, when a tool shortage occurs in the first machining device 11, the workpiece W that is being machined at the first machining position Ma1 becomes a defective piece, and the workpiece W at the first standby position Mb1 remains in the pre-machining state.

When a tool shortage signal is acquired from the first CNC system controller 61 (S21: YES), the cell controller 70 determines whether there is another machining device (the second machining device 12, in the present embodiment) that is able to machine the workpiece W at the first standby position Mb1 (S22). In the present embodiment, because the first machining device 11 and the second machining device 12 are the same kind of machining centers and store the same kinds of tools, the workpiece W can be machined by the second machining device 12. However, when the machining devices 11, 12 store different kinds of tools (the kinds of tools stored in the first machining device 11 differ from the kinds of tools stored in the second machining device 12), whether there can be another machining device that is able to machine the workpiece W depends on the workpiece W to be machined.

When there is no other machining device that is able to machine the workpiece W (when the second machining device 12 is not able to machine the workpiece W) (S22: NO), the cell controller 70 makes the conveyor 50 convey the pallet P at the first standby position Mb1 to the pallet storage room 30 (S23). Then, the cell controller 70 stores the machining status information (illustrated in FIG. 2) of the conveyed pallet P as the suspended state (S24).

As described above, when the first machining device 11 is not able to machine the workpiece W and further the second machining device 12 is not able to machine the workpiece W, it is not possible to machine the workpiece W with the machining devices 11, 12. In this case, the workpiece W is regarded as being in the suspended state, and is conveyed to the pallet storage room 30. Then, when it becomes possible to machine the workpiece W with any one of the machining devices 11, 12, the suspended state is cancelled and the workpiece W is placed in the machining-waiting state. When there is the pallet P in the suspended state, the cell controller 70 gives a warning to a worker. Upon reception of the warning, the worker confirms the reason for the suspended state. If a tool shortage is a factor of the suspended state, the worker is promoted to perform a work that enables replacement of the tool. That is, it is possible to give an appropriate instruction to the worker by storing the machining status information as the suspended state instead of storing the machining status information as the machining-waiting state.

Subsequently, the cell controller 70 determines whether the operation of the first pallet changer 21 is completed (S25). When the operation is completed, the workpiece W positioned at the first machining position Ma1 as a defective piece is moved to the first standby position Mb1. When the operation of the first pallet changer 21 is completed (S25: YES), the cell controller 70 makes the conveyor 50 convey the pallet P at the first standby position Mb1 to the pallet storage room 30 (S26). Then, the cell controller 70 stores the machining status information (illustrated in FIG. 2) of the conveyed pallet P as the defective state (S27).

Figure 4:
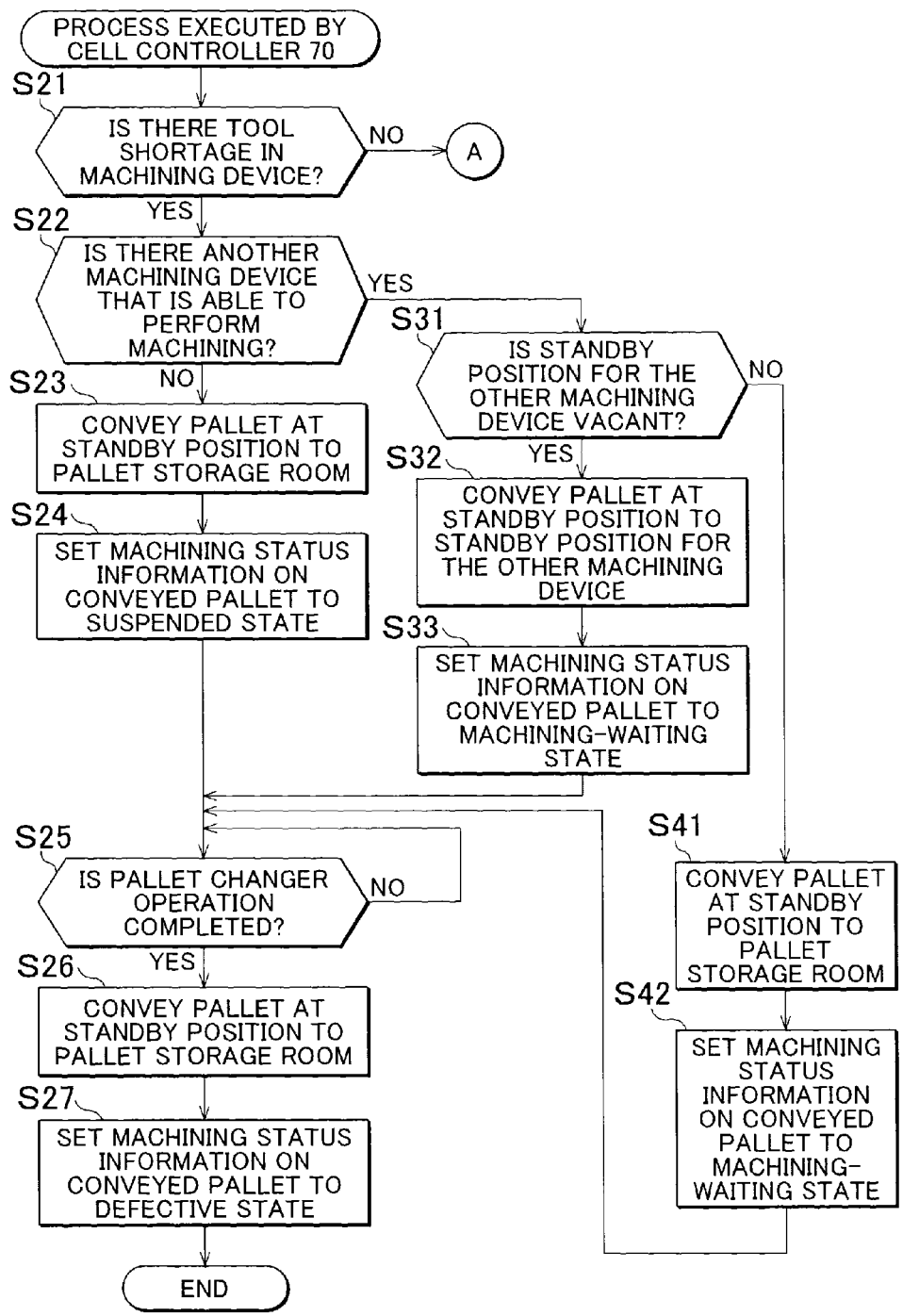
FIG. 4 is a flowchart illustrating a process executed by the cell controller.

When it is determined in S22 in FIG. 4 that there is another machining device that is able to machine the workpiece W (the second machining device 12 is able to machine the workpiece W) (S22: YES), the cell controller 70 determines whether the second standby position Mb2 of the second pallet changer 22 corresponding to the other machining device is vacant (S31). When the second standby position Mb2 is vacant (S31: YES), the cell controller 70 makes the conveyor 50 convey the pallet P at the first standby position Mb1 to the second standby position Mb2 for the other machining device (the second machining device 12) (S32). Then, the cell controller 70 stores the machining status information (see FIG. 2) of the pallet P conveyed to the second standby position Mb2 as the machining-waiting state (S33). Thus, the workpiece W is machined next by the second machining device 12. When there is the workpiece W, as a defective piece, at the first machining position Ma1, subsequently, processes in S25 the following processes are executed.

When it is determined in S31 in FIG. 4 that the second machining device 12 is able to machine the workpiece W (S22: YES) and the second standby position Mb2 of the second pallet changer 22 corresponding to the second machining device 12 is not vacant (S31: NO), the cell controller 70 executes the following processes. The cell controller 70 makes the conveyor 50 convey the pallet P at the first standby position Mb1 to the pallet storage room 30 (S41). Then, the cell controller 70 stores the machining status information (see FIG. 2) of the pallet P conveyed to the pallet storage room 30 as the machining-waiting state (S42). Thus, the workpiece W is machined by the second machining device 12 subsequent to the workpiece W at the second standby position Mb2. When there is the workpiece W, as a defective piece, at the first machining position Ma1, the process in S25 and the following processes are executed.

Figure 5:
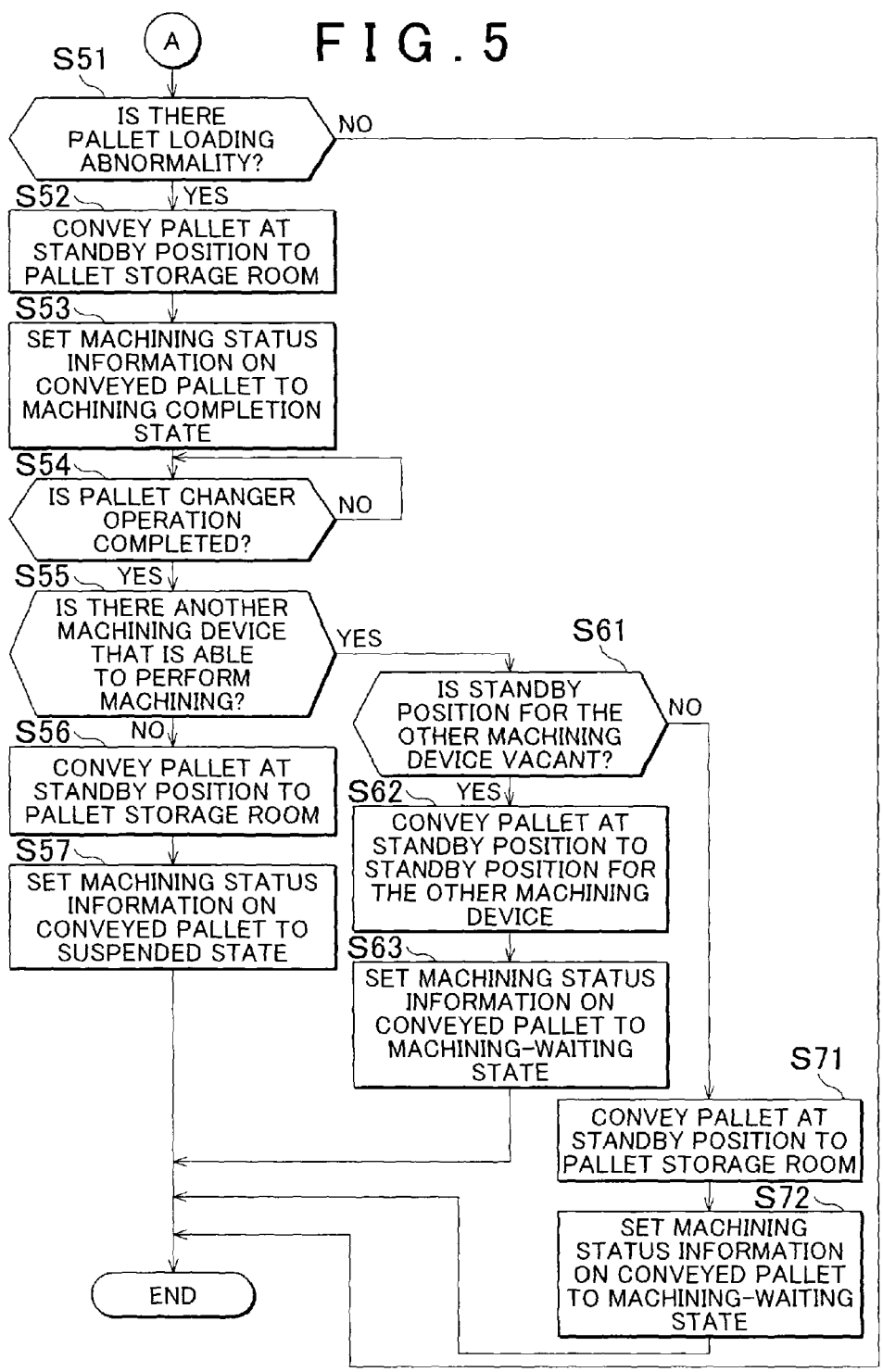
FIG. 5 is a flowchart illustrating a process executed by the cell controller.

Next, description will be provided with reference to FIG. 5. When it is determined in S21 in FIG. 4 that a tool shortage signal is not acquired from the first CNC system controller 61 (S21: NO), the cell controller 70 determines whether a pallet loading abnormality signal is acquired from the first CNC system controller 61 (S51). When a pallet loading abnormality occurs in the first machining device 11, there is the workpiece W, which has not been machined, at the first machining position Ma1, and there is the workpiece W, which has been machined, at the first standby position Mb1.

When a pallet loading abnormality signal is acquired from the first CNC system controller 61 (S51: YES), the cell controller 70 makes the conveyor 50 convey the pallet P at the first standby position Mb1 to the pallet storage room 30 (S52). Then, the cell controller 70 stores the machining status information (illustrated in FIG. 2) of the pallet P conveyed to the pallet storage room 30 as the machining completion state (S53).

Subsequently, the cell controller 70 determines whether the operation of the first pallet changer 21 is completed (S54). When the operation of the first pallet changer 21 is completed, the workpiece W at the first machining position Ma1, which has not be machined, is moved to the first standby position Mb1.

Subsequently, the cell controller 70 determines whether there is another machining device that is able to machine (the second machining device 12 is able to machine) the workpiece W at the first standby position Mb1 (S55). When there is no machining device that is able to machine the workpiece W (S55: NO), the cell controller 70 makes the conveyor 50 convey the pallet P at the first standby position Mb1 to the pallet storage room 30 (S56). Then, the cell controller 70 stores the machining status information (see FIG. 2) of the conveyed pallet P as the suspended state (S57). Then, the process ends.

When it is determined in S55 in FIG. 5 that there is another machine that is able to machine the workpiece (the second machining device 12 is able to machine the workpiece) (S55: YES), the cell controller 70 determines whether the second standby position Mb2 of the second pallet changer 22 corresponding to the other machining device is vacant (S61). When the second standby position Mb2 is vacant (S61: YES), the cell controller 70 makes the conveyor 50 convey the pallet P at the first standby position Mb1 to the second standby position Mb2 for the second machining device 12 (S62). Then, the cell controller 70 stores the machining status information on the pallet P conveyed to the second standby position Mb2 as the machining-waiting state (S63). Thus, the workpiece W is machined next by the second machining device 12. Then, the process ends.

When it is determined in S61 in FIG. 5 that the second machining device 12 is able to machine the workpiece W (S55: YES) and the second standby position Mb2 of the second pallet changer 22 corresponding to the second machining device 12 is not vacant (S61: NO), the following processes are executed. The cell controller 70 makes the conveyor 50 convey the pallet P at the first standby position Mb1 to the pallet storage room 30 (S71). Then, the cell controller 70 stores the machining status information on the pallet P conveyed to the pallet storage room 30 as the machining-waiting state (S72). Thus, the workpiece W is machined by the second machining device 12 subsequent to the workpiece W at the second standby position Mb2. Then, the process ends.

Figure 6:
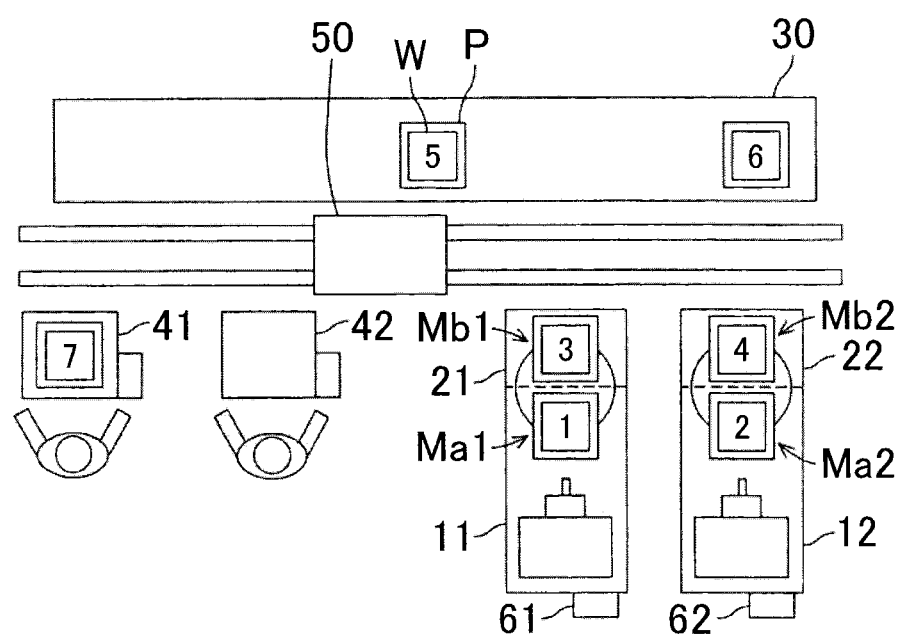
FIG. 6 is a view illustrating an initial state as a first example.
Figure 7:
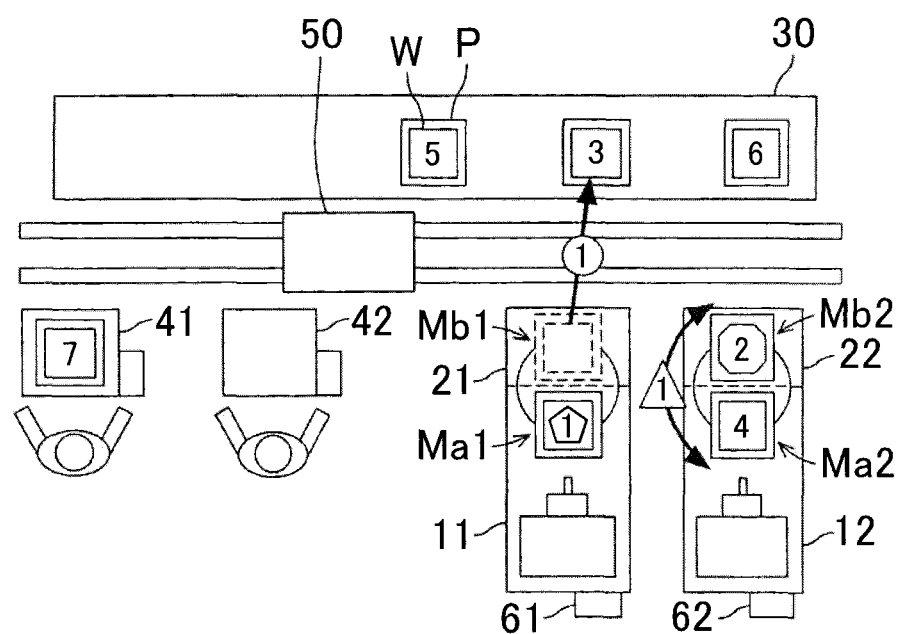
FIG. 7 is a view illustrating an operation state when a tool shortage occurs in a first machining device after the initial state in FIG. 6.
Figure 8:
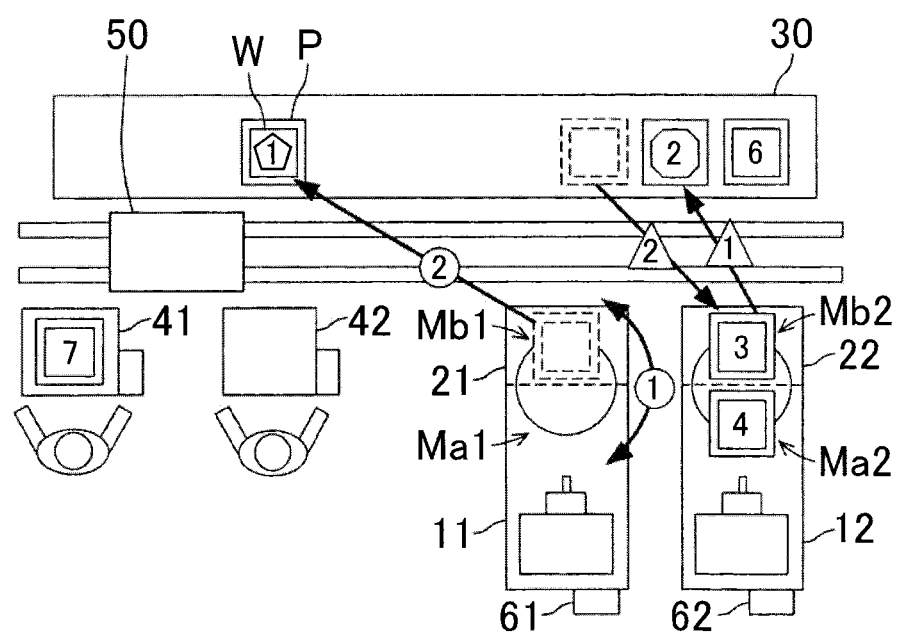
FIG. 8 is a view illustrating a state achieved after the state in FIG. 7.

Next, a first example of the operation that is executed after a tool shortage occurs while the workpiece W is being machined by the first machining device 11 will be described with reference to FIG. 6 to FIG. 8. The initial state is as illustrated in FIG. 6. In FIG. 6 to FIG. 8, the number attached to each pallet P denotes the order of priority. That is, a smaller number denotes a higher priority. In FIG. 6 to FIG. 8, a square workpiece W denotes a workpiece that has not been machined, an octagonal workpiece W denotes a workpiece that has been machined, and a pentagonal workpiece W denotes a defective piece. In FIG. 7 and FIG. 8, the encircled numbers denote the order of operation relating to the first machining device 11, and the numbers surrounded by triangles denote the order of operation relating to the second machining device 12.

As illustrated in FIG. 6, in the initial state, a workpiece W having the first priority is located at the first machining position Ma1, a workpiece W having the second priority is located at the second machining position Ma2, and the workpieces W having the first and second priorities are being machined. A workpiece W having the third priority is located at the first standby position Mb1, and a workpiece W having the fourth priority is located at the second standby position Mb2. In the pallet storage room 30, workpieces W having the fifth priority and the sixth priority are stored. A new workpiece W having the seventh priority is loaded on the LD-ST 41.

When the tool of the first machining device 11 is broken in the state illustrated in FIG. 6 and the workpiece W at the first machining position Ma1 becomes a defective piece, the cell controller 70 makes an affirmative determination in S21 in FIG. 4, makes an affirmative determination in S22 in FIG. 4, a negative determination in S31 in FIG. 4, and executes the process in S41 and S42 in FIG. 4. That is, as illustrated in FIG. 7, the pallet P (the third priority) at the first standby position Mb1 is conveyed to the pallet storage room 30 by the conveyor 50. Then, the machining status information on the pallet P conveyed to the pallet storage room 30 is stored as the machining-waiting state.

At this time, the second machining device 12 normally completes machining of the workpiece W at the second machining position Ma2, and the second pallet changer 22 is operated. Then, the workpiece W, which has the fourth priority and which has not been machined, is moved to the second machining position Ma2, and the workpiece W, which has the second priority and which has been machined, is moved to the second standby position Mb2.

Next, the cell controller 70 executes the process in S42 in FIG. 4, makes an affirmative determination in S25 in FIG. 4, executes the process in S26 in FIG. 4, and executes the process in S27 in FIG. 4. That is, as illustrated in FIG. 8, the first pallet changer 21 is operated, whereby the workpiece W, as a defective piece, at the first machining position Ma1 is moved to the first standby position Mb1. Subsequently, the pallet P is conveyed from the first standby position Mb1 to the pallet storage room 30. Then, the machining status information on the conveyed pallet P is stored as the defective state.

At this time, the workpiece W, which has been machined, is conveyed from the second machining device 12 to the pallet storage room 30. Then, a pallet P having a highest priority (having a smallest number) among the pallets P that are in the machining-waiting state and that are in the pallet storage room 30 is conveyed from the pallet storage room 30 to the second standby position Mb2. In this case, as illustrated in FIG. 7, the pallet P having the third priority has been conveyed from the first standby position Mb1 to the pallet storage room 30 and the machining status information thereof is stored as the machining-waiting state, and thus the pallet P is conveyed to the second standby position Mb2.

As described above, even after the pallet P is conveyed to the first standby position Mb1, if the workpiece W attached to the pallet P has not been machined, the pallet P is returned to the pallet storage room 30 when it becomes impossible to machine the workpiece W with the first machining device 11. Then, the machining status information on the pallet P returned to the pallet storage room 30 is stored as the machining-waiting state instead of the defective state. Thus, when the second machining device 12 becomes able to machine the workpiece W attached to the pallet P, the pallet P is conveyed to the second machining device 12. That is, the workpiece W attached to the pallet P is machined ultimately without being treated as a defective piece.

The cell controller 70 determines whether it is possible to machine the workpiece W attached to the pallet P at the first standby position Mb1. When it is determined that it is not possible to machine the workpiece W, the cell controller 70 makes the conveyor 50 convey the pallet P at the first standby position Mb1 to the pallet storage room 30 before conveying the pallet P at the first machining position Ma1. Thus, it is possible to promptly convey the pallet P at the first standby position Mb1 to the pallet storage room 30. Then, when there is another machining device (the second machining device 12) that is able to machine the workpiece W attached to the pallet P that has been conveyed to the pallet storage room 30 and that is in the machining-waiting state, it is possible to promptly machine the workpiece W.

Next, a second example of the operation that is executed after a tool shortage occurs while the workpiece W is being machined by the first machining device 11 will be described with reference to FIG. 9 and FIG. 10. Only a difference from the first example will be described below.

Figure 9:
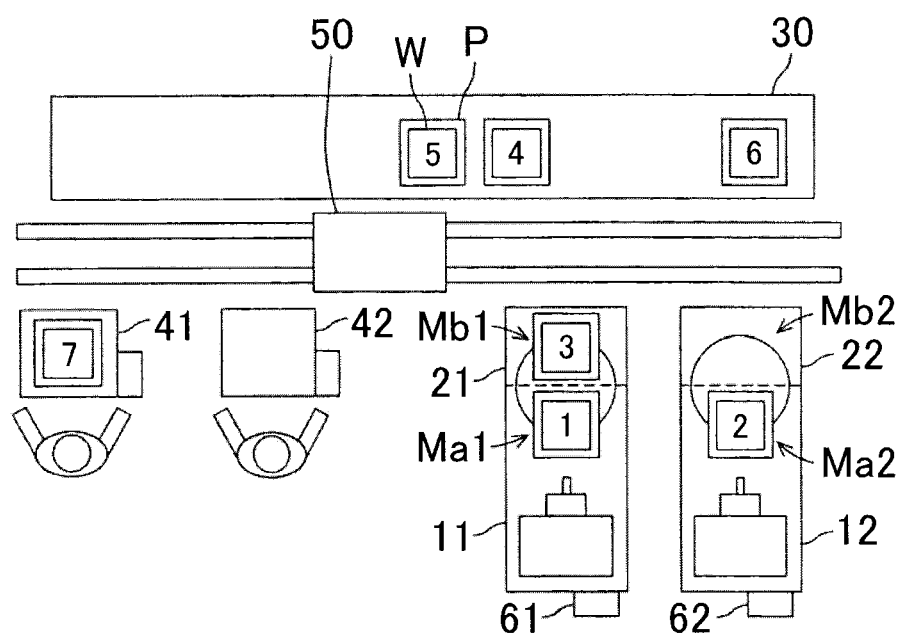
FIG. 9 is a view illustrating an initial state as a second example.

As illustrated in FIG. 9, in the initial state, there is no pallet P at the second standby position Mb2. In this case, the tool of the first machining device 11 is broken, and the workpiece W at the first machining position Ma1 becomes a defective piece. Then, the cell controller 70 makes an affirmative determination in S21 in FIG. 4, makes an affirmative determination in S22 in FIG. 4, makes an affirmative determination in S31 in FIG. 4, executes the process in S32 in FIG. 4, and executes the process in S33 in FIG. 4.

Figure 10:
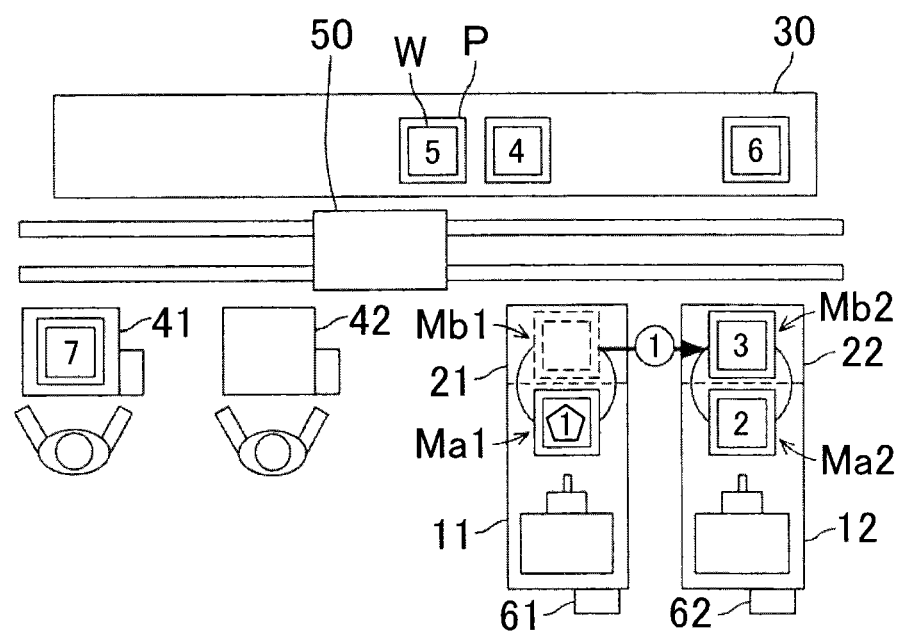
FIG. 10 is a view illustrating an operation state when a tool shortage occurs in the first machining device after the initial state in FIG. 9.

That is, as illustrated in FIG. 10, the pallet P (having the third priority) at the first standby position Mb1 is conveyed to the second standby position Mb2 by the conveyor 50. Then, the machining status information on the pallet P conveyed to the second standby position Mb2 is stored as the machining-waiting state.

Then, the first pallet changer 21 is operated, and the workpiece W as a defective piece is moved to the first standby position Mb1. Subsequently, the workpiece W is conveyed to the pallet storage room 30, and the machining status information on the pallet P is stored as the defective state. When machining of the workpiece W having the second priority by the second machining device 12 is completed, the workpiece W having the third priority conveyed from the first standby position Mb1 is machined by the second machining device 12.

As described above, even when it is determined that machining by the first machining device 11 is impossible after the pallet P is conveyed to the first standby position Mb1, if machining by the second machining device 12 is possible, the pallet P is conveyed from the first standby position Mb1 to the second standby position Mb2, and the workpiece W attached to the pallet P is machined by the second machining device 12. In this way, the workpiece W attached to the pallet P is machined as promptly as possible. That is, the workpiece W is reliably machined by the second machining device 12 without greatly changing the priority initially set for the workpiece W.

In the above-described embodiment, the invention is applied to the case where there are two machining devices, that is, the first and second machining devices 11, 12. However, the invention may be applied to the case where there are three or more machining devices. Even if a tool is broken during machining of a workpiece W, it may be possible to machine the workpiece W with another machining device, depending on the state of the workpiece W that is being machined. In this case, the workpiece W is conveyed as being in the machining-waiting state instead of the defective state.

What is claimed is:

1. A flexible manufacturing system comprising:
    a machining device that has a machining position where a pallet is disposed during machining, and machines a workpiece that has not been machined and that is attached to the pallet disposed at the machining position;
    a pallet storage room that stores a plurality of the pallets;
    a pallet changer that is provided integrally with or adjacent to the machining device, has a standby position where the pallet to be moved to the machining position stands by, and exchanges the pallet at the machining position for the pallet at the standby position;
    a conveyor that is able to convey the pallet between the pallet storage room and the standby position of the pallet changer; and
    a controller that controls the machining device and the pallet changer, and controls the conveyor based on machining status information associated with each of the pallets stored in the pallet storage room, the machining status information including a machining-waiting state and a machining completion state, wherein
    after the pallet is conveyed to the standby position and before machining of the workpiece attached to the pallet is started, the controller determines whether machining of the workpiece with the machining device is possible,
    when it is determined that machining is possible, the controller starts machining with the machining device, and
    when it is determined that machining is impossible, the controller makes the conveyor convey the pallet from the standby position to the pallet storage room, and stores the machining status information on the conveyed pallet as the machining-waiting state, wherein:
    a plurality of the machining devices are provided;
    a plurality of the pallet changers are provided; wherein
    when it is determined that machining with a first machining device of the plurality of the machining devices is impossible, the controller determines whether there is a second machining device that is able to machine the workpiece to be machined, among the plurality of the machining devices, and
    when it is determined that there is the second machining device, the controller makes the conveyor convey the pallet from a first standby position of the pallet changer for the first machining device to a second standby position of the pallet changer for the second machining device, instead of conveying the pallet from the first standby position to the pallet storage room.

2. The flexible manufacturing system according to claim 1, wherein:
    the machining status information includes a suspended state indicating that none of the machining devices is possible to perform machining; and
    when it is determined that machining with the first machining device is impossible and it is determined that there is no second machining device that is able to machine the workpiece to be machined, the controller makes the conveyor convey the pallet from the first standby position to the pallet storage room and stores the machining status information on the pallet conveyed to the pallet storage room as the suspended state.

3. The flexible manufacturing system according to claim 1, wherein:
    the controller determines whether machining of the workpiece attached to the pallet at the standby position is possible; and
    when it is determined that machining is impossible, the controller makes the conveyor convey the pallet at the standby position to the pallet storage room before conveying the pallet at the machining position.

4. The flexible manufacturing system according to claim 2, wherein:
    the controller determines whether machining of the workpiece attached to the pallet at the standby position is possible; and
    when it is determined that machining is impossible, the controller makes the conveyor convey the pallet at the standby position to the pallet storage room before conveying the pallet at the machining position.

* * * * *